US009014191B1

(12) United States Patent
Mandal et al.

(10) Patent No.: US 9,014,191 B1
(45) Date of Patent: Apr. 21, 2015

(54) SEPARATING ROUTING DOMAINS FOR VIRTUALIZED NETWORKS WHEN IMPLEMENTING A TUNNELING PROTOCOL

(71) Applicant: Google Inc., Mountain View, CA (US)

(72) Inventors: Subhasree Mandal, San Jose, CA (US); Amin Vahdat, Los Altos, CA (US)

(73) Assignee: Google Inc., Mountain View, CA (US)

( * ) Notice: Subject to any disclaimer, the term of this patent is extended or adjusted under 35 U.S.C. 154(b) by 80 days.

(21) Appl. No.: 13/630,797

(22) Filed: Sep. 28, 2012

(51) Int. Cl.
*H04L 12/28* (2006.01)
*H04L 12/26* (2006.01)

(52) U.S. Cl.
CPC .................................. *H04L 12/2621* (2013.01)

(58) Field of Classification Search
CPC ............ G06F 2009/45595; G06F 2009/45587; H04L 12/4641
See application file for complete search history.

(56) References Cited

U.S. PATENT DOCUMENTS

| 7,281,039 | B1 | 10/2007 | Salkewicz |
| 7,383,357 | B2 | 6/2008 | Leichter et al. |
| 7,461,148 | B1 | 12/2008 | Beloussov et al. |
| 7,688,829 | B2 | 3/2010 | Guichard et al. |
| 7,894,432 | B2 | 2/2011 | Rana et al. |
| 7,945,696 | B2 | 5/2011 | Vasseur et al. |
| 2009/0089406 | A1 | 4/2009 | Roush et al. |
| 2010/0174811 | A1 | 7/2010 | Musiri et al. |
| 2011/0060819 | A1 | 3/2011 | Salkewicz |
| 2011/0075667 | A1 | 3/2011 | Li et al. |
| 2011/0142053 | A1* | 6/2011 | Van Der Merwe et al. .......................... 370/395.1 |
| 2011/0235545 | A1 | 9/2011 | Subramanian et al. |
| 2013/0343385 | A1* | 12/2013 | Benny et al. .................. 370/392 |

* cited by examiner

*Primary Examiner* — John Blanton
(74) *Attorney, Agent, or Firm* — Edward A. Gordon; Foley & Lardner LLP

(57) ABSTRACT

Systems and techniques for forwarding a data packet between network components in a virtualized network system are presented. Virtual machines in each virtual network in the virtualized network system are mapped to a unique routing table. Internet protocol (IP) addresses of virtual machines in a virtual network can overlap with IP addresses of virtual machines in another virtual network. A data packet is associated with a particular virtual network based on a tag stored in the data packet. As such, the data packet is forwarded based on a particular routing table associated with the particular virtual network. Additionally, routing domain information can be encoded into an outer source IP field of the data packet at the beginning of an IP tunnel. Furthermore, the routing domain information in the outer source IP field can be used to forward the data packet at the end of the IP tunnel.

25 Claims, 12 Drawing Sheets

SEPARATING ROUTING DOMAINS FOR VIRTUALIZED NETWORKS WHEN IMPLEMENTING A TUNNELING PROTOCOL

TECHNICAL FIELD

This disclosure relates generally to networking, and more specifically, to forwarding data in a virtualized network system when implementing a tunneling protocol.

BACKGROUND

In a virtualized data center, different virtual networks can be hosted on the same physical network. For example, a physical network can include more than one virtual network (e.g., a physical network can be treated as a multiple overlay network). Each virtual network can include one or more virtual machines (e.g., hosts) with unique internet protocol (IP) addresses. Virtual machines with conflicting internet protocol (IP) addresses may be hosted on the virtual networks coupled to the same physical switch. For example, one or more virtual machines on a first virtual network can include the same IP address as one or more virtual machines on a second virtual network. Furthermore, a virtual network can be implemented on multiple physical networks. For example, one or more virtual machines in a virtual network can be coupled to a particular router (e.g., a particular physical router) and one or virtual machines in the virtual network can be coupled to a different router (e.g., a different physical router). Therefore, a tunneling protocol can be implemented to forward a data packet between physical routers. However, conventional virtualized network systems do not adequately provide isolation between virtual networks when implementing a tunneling protocol.

SUMMARY

The following presents a simplified summary of the specification in order to provide a basic understanding of some aspects of the specification. This summary is not an extensive overview of the specification. It is intended to neither identify key or critical elements of the specification, nor delineate any scope of the particular implementations of the specification or any scope of the claims. Its sole purpose is to present some concepts of the specification in a simplified form as a prelude to the more detailed description that is presented later.

In accordance with an implementation, a system includes a mapping component, a management component, a routing component and an encapsulation component. The mapping component maps a plurality of first virtual machines with a plurality of unique addresses in a first virtual network to a first routing table and a plurality of second virtual machines with the plurality of unique addresses in a second virtual network to a second routing table. The management component associates a data packet with the first virtual network or the second virtual network based on a tag stored in the data packet. The routing component forwards the data packet based on the first routing table in response to a determination that the data packet is associated with the first virtual network and forwards the data packet based on the second routing table in response to a determination that the data packet is associated with the second virtual network. The encapsulation component encodes routing domain information into an outer source internet protocol (IP) field of the data packet.

In accordance with another implementation, a system includes a mapping component, a decapsulation component and a routing component. The mapping component maps a plurality of first virtual machines with a plurality of unique addresses in a first virtual network to a first routing table and a plurality of second virtual machines with the plurality of unique addresses in a second virtual network to a second routing table. The decapsulation component associates a data packet with the first virtual network or the second virtual network based on a tag coded in an outer source internet protocol (IP) field of the data packet. The routing component forwards the data packet using the first routing table in response to a determination that the data packet is associated with the first virtual network and forwards the data packet using the second routing table in response to a determination that the data packet is associated with the second virtual network.

Additionally, a non-limiting implementation provides for maintaining one or more routing tables for one or more virtual networks, receiving a data packet from a particular virtual network, associating the data packet with the particular virtual network based on a tag, forwarding the data packet based on routing table associated with the tag, and encoding routing domain information into an outer source internet protocol (IP) field of the data packet.

Furthermore, a non-limiting implementation provides for maintaining one or more routing tables for one or more virtual networks, receiving an encapsulated data packet via a tunneling protocol, obtaining routing domain information from an outer source IP field of the encapsulated data packet, associating the encapsulated data packet with a particular virtual network based on a routing domain information stored in an outer source internet protocol (IP) field of the encapsulated data packet, decapsulating the encapsulated data packet to generate a decapsulated data packet, and forwarding the decapsulated data packet to a virtual machine using a particular routing table corresponding to the particular virtual network.

The following description and the annexed drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

BRIEF DESCRIPTION OF THE DRAWINGS

Numerous aspects, implementations, objects and advantages of the present invention will be apparent upon consideration of the following detailed description, taken in conjunction with the accompanying drawings, in which like reference characters refer to like parts throughout, and in which.

DETAILED DESCRIPTION

Figure 1:
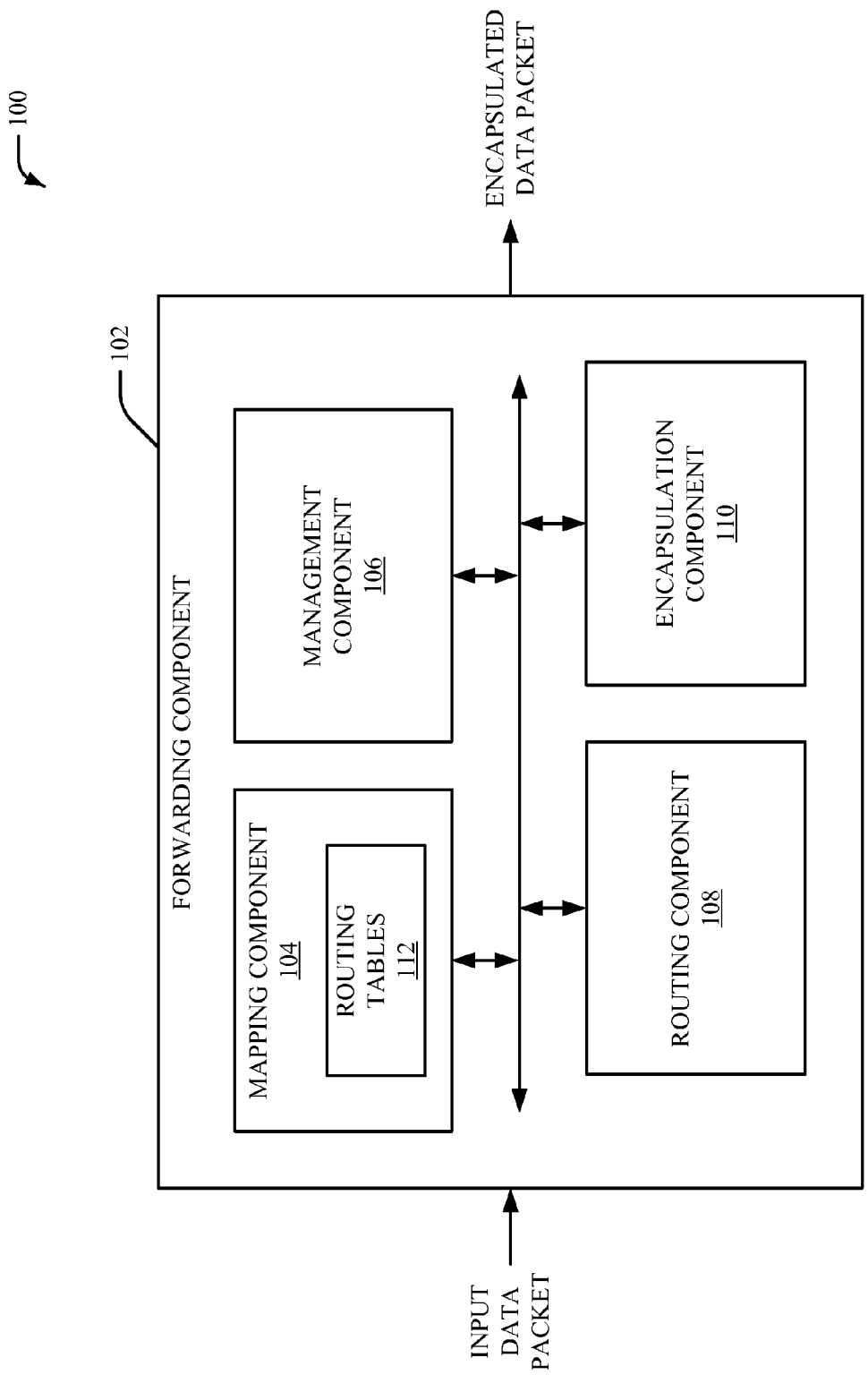
FIG. 1 illustrates a high-level block diagram of an example forwarding component for an input data packet, in accordance with various aspects and implementations described herein.

Various aspects of this disclosure are now described with reference to the drawings, wherein like reference numerals are used to refer to like elements throughout. In the following description, for purposes of explanation, numerous specific details are set forth in order to provide a thorough understanding of one or more aspects. It should be understood, however, that certain aspects of this disclosure may be practiced without these specific details, or with other methods, components, materials, etc. In other instances, well-known structures and devices are shown in block diagram form to facilitate describing one or more aspects.

In a virtualized data center, different virtual networks can be hosted on the same physical network. For example, a physical network can include more than one virtual network (e.g., a physical network can be treated as a multiple overlay network). Each virtual network can include one or more virtual machines (e.g., hosts) with unique internet protocol (IP) addresses. Virtual machines with conflicting IP addresses may be hosted on the virtual networks coupled to the same physical switch. For example, one or more virtual machines on a first virtual network can include the same IP address as one or more virtual machines on a second virtual network. Furthermore, a virtual network can be implemented on multiple physical networks. For example, one or more virtual machines in a virtual network can be coupled to a particular router (e.g., a particular physical router) and one or virtual machines in the virtual network can be coupled to a remote router (e.g., a remote physical router). Therefore, a tunneling protocol can be implemented to forward a data packet between physical routers (e.g., remote routers).

However, conventional virtualized network systems do not adequately provide isolation between such virtual networks when implementing a tunneling protocol. For example, certain conventional virtualized network systems implement a separate virtual local area network (VLAN) tag for each virtual network. Yet, such a solution can result in a transient loop when transmitting a data packet throughout a virtualized network system. In another example, intermediate routers in a network can be individually configured to forward data packets. For example, all the intermediate routers in the network can be configured with numerous tags and/or destination IP addresses for forwarding data packets. However, such a solution can cause scaling problems since the routing state of all intermediate routers would increase in proportion to the number of routing domains. Furthermore, individually configuring all the intermediate routers in the network can be difficult and/or inefficient.

To that end, techniques for maintaining isolation of virtual networks during a tunneling protocol (e.g., IP-in-IP) are presented. For example, a source IP field in an outer header (e.g., an encapsulated header) of a data packet can include (e.g., can be encapsulated with) routing domain information. Since a source IP field of an outer header is not used by intermediate routers throughout a tunnel (e.g., an IP tunnel), configuring an arbitrarily large number of intermediate routers in a network (e.g., in the IP tunnel) can be avoided. Systems and methods disclosed herein relate to forwarding data packets in a virtualized network system during a tunneling protocol using circuitry and/or instructions stored or transmitted in a computer readable medium. For example, each routing domain (e.g., virtual network) in a virtualized network system can be assigned a unique tag. The unique tag can be encoded (e.g., via encapsulation) into the source IP field in the outer header of the data packet at the beginning of the tunnel. Additionally, a destination IP address can be encoded into a destination IP field in the outer header of the data packet at the beginning of the tunnel. Intermediate forwarding routers in the IP tunnel can forward the data packet to a destination router (e.g., a destination node in the IP tunnel) based on the destination IP field in the outer header of the data packet. At the end of the tunnel, the destination router can decapsulate the data packet. The destination router can determine the virtual network (e.g., the routing domain, the namespace, etc.) for the data packet based on the tag (e.g., routing domain information) included in the source IP field in the outer header of the data packet. As such, the data packet can be associated with a particular virtual network. For example, the data packet can be marked with a Virtual Routing and Forwarding (VRF) field associated with the particular virtual network. Further forwarding can be implemented based on the tag and/or a corresponding routing table for the particular virtual network. Therefore, isolation between such virtual networks residing on the same virtualized network system (e.g., physical network) can be achieved (e.g., a data packet can be contained within a particular virtual network). As such, configuring an arbitrarily large number of intermediate routers can be avoided and/or isolation of a virtual network can be maintained.

Referring initially to FIG. 1, there is illustrated an example system 100 that forwards a data packet based on a source IP field in an outer header of a data packet, according to an aspect of the subject disclosure. The system 100 can be implemented in a virtualized network system. Furthermore, the system 100 can be implemented at the beginning (e.g., at a source endpoint) of an IP tunnel (e.g., at a starting point when implementing an IP-in-IP tunneling protocol). Aspects of the systems, apparatuses or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described.

Specifically, the system 100 can provide a component with a mapping feature (e.g., mapping component 104), a management feature (e.g., management component 106), a routing feature (e.g., a routing component 108) and an encapsulation feature (e.g., an encapsulation component 110) that can be utilized in most any networking application. The mapping feature can map a plurality of first virtual machines with a plurality of unique addresses in a first virtual network to a first routing table and a plurality of second virtual machines with the plurality of unique addresses in a second virtual network to a second routing table. The management feature can associate a data packet with the first virtual network or the second virtual network based on a tag stored in the data packet. The routing feature can forward the data packet based on the first routing table in response to a determination that the data packet is associated with the first virtual network and can forward the data packet based on the second routing table in response to a determination that the data packet is associated with the second virtual network. The encapsulation feature can encode the routing domain information into an outer source IP field of the data packet. The system 100 can be employed by various systems, such as, but not limited to data center systems (e.g., virtualized data center systems), network systems (e.g., virtualized network systems), computer network systems (e.g., virtualized computer network systems), communication systems, router systems, server systems, high availability server systems (e.g., Telecom server systems), Web server systems, file server systems, media server systems, disk array systems, powered insertion board systems, and the like.

In particular, the system 100 can include a forwarding component 102. In FIG. 1, the forwarding component 102 includes a mapping component 104, a management component 106, a routing component 108 and an encapsulation component 110. The forwarding component 102 can receive a data packet (e.g., INPUT DATA PACKET shown in FIG. 1). The data packet can include an inner IP header (e.g., a packet header).

The mapping component 104 can map (or be configured to map) one or more virtual machines (e.g., one or more hosts, one or more virtual devices, etc.) to a particular virtual network using a routing table. Each virtual network in a virtual network system can include a different routing table (e.g., a unique routing table). For example, the mapping component 104 can map a plurality of first virtual machines with a plurality of unique addresses (e.g., unique routing names, unique IP addresses, etc.) in a first virtual network to a first routing table and a plurality of second virtual machines with the plurality of unique addresses (e.g., with overlapping IP addresses) in a second virtual network to a second routing table. Therefore, one or more virtual networks in a virtual network system can include one or more overlapping IP addresses (e.g., one or more virtual machines with overlapping IP addresses). As such, the mapping component 104 can maintain (e.g., store) one or more routing tables 112. Furthermore, one or more virtual machines with IP addresses that do not overlap with another virtual machine in the virtual network system can be included in one or more of the routing tables. Each of the routing tables can represent (e.g., can be associated with) a particular virtual network. Each virtual network can define a namespace (e.g., a network identification). In one example, a virtual network can be implemented as a Virtual Private Cluster (VPC). Furthermore, a unique tag can be associated with each of the one or more routing tables (e.g., a unique tag can be associated with a particular virtual network). Each virtual network can be implemented (e.g., maintained) on multiple physical networks. For example, a particular virtual network can include one or more virtual machines coupled to a first router, one or more virtual machines coupled to a second router, one or more virtual machines coupled to a third router, etc.

The management component 106 can associate (or be configured to associate) a data packet with a particular virtual network based on a tag stored in the data packet (e.g., the data packet header, metadata of the data packet, an inner header of the data packet, an outer header of the data packet, etc.). For example, the management component 106 can associate a data packet with the first virtual network or the second virtual network based on a tag stored in the data packet. The tag stored in the data packet can be associated with a particular virtual network using the one or more routing tables maintained by the mapping component 104. For example, the management component 106 can determine a routing table associated with the tag. As a result, the particular virtual network associated with the data packet can be determined.

The routing component 108 can forward (or be configured to forward) the data packet. For example, the routing component 108 can forward the data packet based on the first routing table in response to a determination that the data packet (e.g., the tag) is associated with the first virtual network. Alternatively, the routing component 108 can forward the data packet based on the second routing table in response to a determination that the data packet (e.g., the tag) is associated with the second virtual network. In one example, the data packet can be forwarded to a particular virtual machine coupled to a router (e.g., a physical switch). Therefore, the data packet can be forwarded without being encapsulated. However, in response to a determination that the data packet is to be forwarded to another router (e.g., another physical switch), the data packet can be encapsulated using a tunneling protocol.

The encapsulation component 110 can encapsulate the data packet with an outer header. As such, the encapsulation component 110 can generate an encapsulated data packet (e.g., ENCAPSULATED DATA PACKET shown in FIG. 1) via a tunneling protocol. The encapsulation component 110 can encode (or be configured to encode) routing domain information into a source IP field of the outer header of the data packet. For example, the encapsulation component 110 can encode a tag into the source IP field of the outer header of the data packet during an encapsulation process. Additionally or alternatively, other type of routing information (e.g., isolation domain information) can be encoded into the source IP field of the outer header of the data packet. Therefore, information not used by intermediate routers in an IP tunnel path (e.g., information used only by a router at an endpoint of the tunnel) can be encoded into the source IP field for the outer header of the data packet.

While FIG. 1 depicts separate components in the system 100, it is to be appreciated that the components may be implemented in a common component. In one example, the mapping component 104, and the management component 106, the routing component 108 and the encapsulation component 110 can be included in a single component. Further, it can be appreciated that the design of system 100 can include other component selections, component placements, etc., to separate routing domains.

Figure 2:
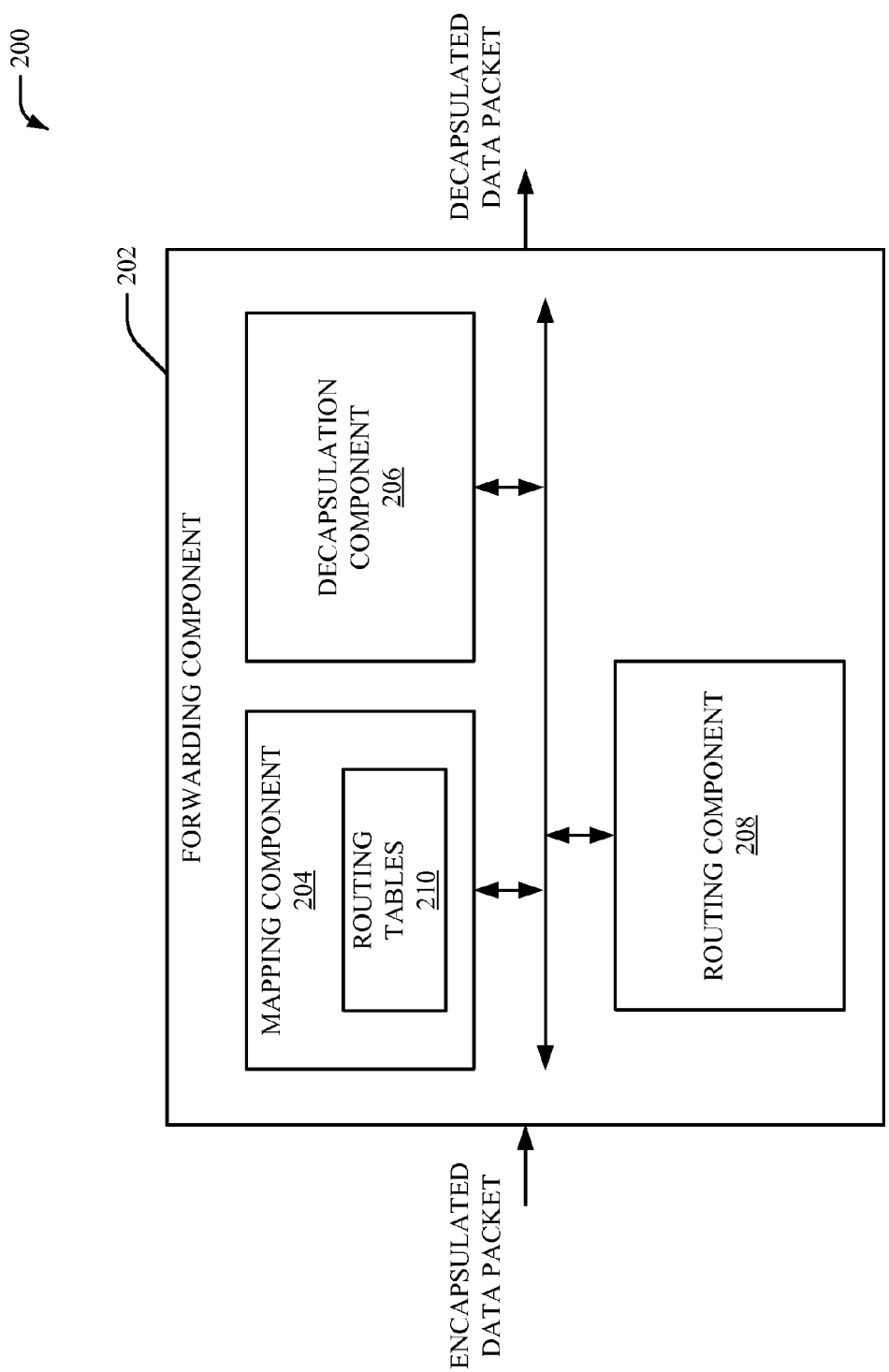
FIG. 2 illustrates a high-level block diagram of an example forwarding component for an encapsulated data packet, in accordance with various aspects and implementations described herein.

Referring now to FIG. 2, there is illustrated an example system 200 that forwards an encapsulated data packet based on information stored in a source IP field in an outer header of the encapsulated data packet, according to an aspect of the subject disclosure. The system 200 can be implemented in a virtualized network system. For example, the system 200 can be implemented at the end (e.g., at a destination endpoint) of an IP tunnel.

The system 200 can provide a component with a mapping feature (e.g., mapping component 204), a decapsulation feature (e.g., decapsulation component 206) and a routing feature (e.g., a routing component 208) that can be utilized in most any networking application. The mapping feature can map a plurality of first virtual machines with a plurality of unique addresses in a first virtual network to a first routing table and a plurality of second virtual machines with the plurality of unique addresses in a second virtual network to a second routing table. The decapsulation feature can associate a data packet with the first virtual network or the second virtual network based on a tag coded in an outer source IP field of the data packet. The routing feature can forward the data packet using the first routing table in response to a determination that the data packet is associated with the first virtual network and can forward the data packet using the second routing table in response to a determination that the data packet is associated with the second virtual network. The system 200 can be employed by various systems, such as, but not limited to data center systems (e.g., virtualized data center systems), network systems (e.g., virtualized network systems), computer network systems (e.g., virtualized computer network systems), communication systems, router systems, server systems, high availability server systems (e.g., Telecom server systems), Web server systems, file server systems, media server systems, disk array systems, powered insertion board systems, and the like.

In particular, the system 200 can include a forwarding component 202. In FIG. 2, the forwarding component 202 includes a mapping component 204, a decapsulation component 206 and a routing component 208. The forwarding component 202 can receive an encapsulated data packet (e.g., ENCAPSULATED DATA PACKET shown in FIG. 2). The data packet can include an inner IP header and an outer IP header (e.g., an encapsulated IP header). The outer IP header can include, for example, a source IP field and a destination IP field for the data packet.

The mapping component 204 can map (or be configured to map) one or more virtual machines (e.g., one or more hosts, one or more virtual devices, etc.) to a particular virtual network using a routing table. The mapping component 204 can be implemented similar to the mapping component 104. As such, each virtual network in a virtual network system can include a different routing table. For example, the mapping component 204 can map a plurality of first virtual machines with a plurality of unique addresses (e.g., unique names, unique IP addresses, etc.) in a first virtual network to a first routing table and a plurality of second virtual machines with the plurality of unique addresses in a second virtual network to a second routing table. Therefore, one or more virtual networks in a virtual network system can include one or more overlapping IP addresses (e.g., one or more virtual machines with overlapping IP addresses). Each of the routing tables can represent (e.g., can be associated with) a particular virtual network. Each virtual network can define a namespace (e.g., a network identification). In one example, a virtual network can be implemented as a VPC. Furthermore, a unique tag can be associated with each of the one or more routing tables (e.g., a unique tag can be associated with a particular virtual network). As such, the mapping component 204 can maintain (e.g., store) one or more routing tables 210.

The decapsulation component 206 can decapsulate the encapsulated data packet. For example, the decapsulation component 206 can decode an outer header of the data packet. As such, the decapsulation component 206 can obtain information stored in the outer header of the data packet. In particular, the decapsulation component 206 can obtain information stored in a source IP field and/or a destination IP field in the outer header. The decapsulation component 206 can associate (or be configured to associate) a data packet with the first virtual network of the second virtual network based on a routing domain information stored (e.g., tag coded) in the source IP field of the outer header of the data packet.

The routing component 208 can forward (or be configured to forward) the data packet (e.g., DECAPSULATED DATA PACKET shown in FIG. 2). For example, the routing component 208 can forward the data packet using the first routing table in response to a determination that the data packet (e.g., the tag) is associated with the first virtual network. Alternatively, the routing component 208 can forward the data packet using the second routing table in response to a determination that the data packet (e.g., the tag) is associated with the second virtual network. As such, the data packet can be forwarded to a virtual network associated with the data packet (e.g., a virtual network that transmitted the data packet) based on the tag associated with the data packet (e.g., routing domain information stored in the outer IP source field of the data packet). For example, the data packet can be forwarded to a virtual machine that belongs to the virtual network associated to the data packet.

While FIG. 2 depicts separate components in the system 200, it is to be appreciated that the components may be implemented in a common component. In one example, the mapping component 204, and the decapsulation component 206 and the routing component 208 can be included in a single component. Further, it can be appreciated that the design of system 200 can include other component selections, component placements, etc., to separate routing domains.

Figure 3:
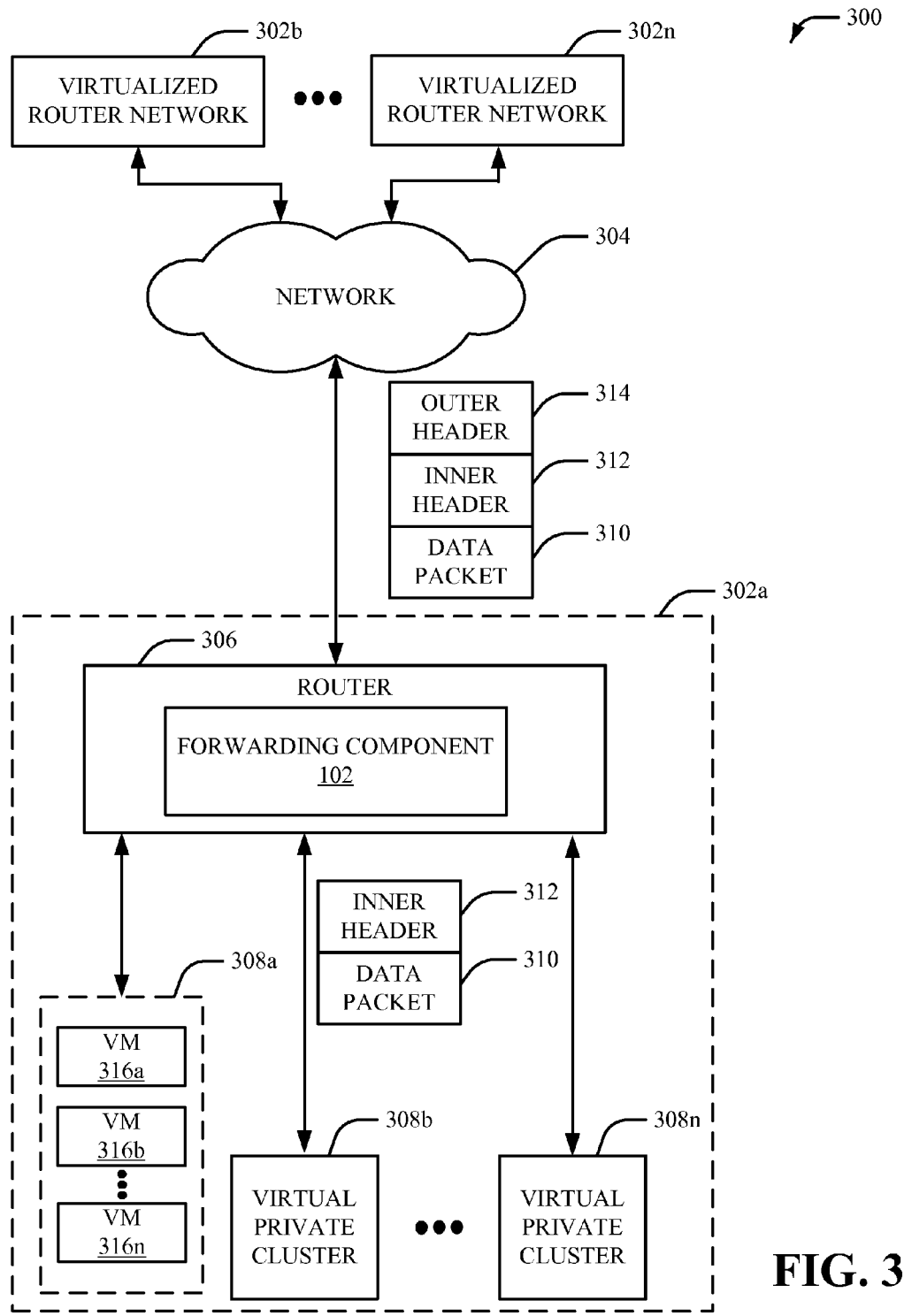
FIG. 3 illustrates a block diagram of an example virtualized network system implementing a forwarding component to forward an input data packet, in accordance with various aspects and implementations described herein.

Referring now to FIG. 3, there is illustrated a non-limiting implementation of a system 300 for encapsulating a data packet in accordance with various aspects and implementations of this disclosure. The system 300 includes a plurality of virtualized router networks 302a-n and a network (e.g., a virtualized network) 304. Each of the virtualized router networks 302a-n (e.g., the virtualized router network 302a shown in FIG. 3) includes a router 306 and one or more virtual private clusters (e.g., virtual networks) 308a-n. In the example shown in FIG. 3, the router 306 includes the forwarding component 102 (and/or the forwarding component 202). The forwarding component 102 can include the mapping component 104, the management component 106, the routing component 108 and the encapsulation component 110. In one example, the router 306 can be implemented as a switch (e.g., a rack switch). Each of the virtual private clusters 308a-n can be implemented as a virtual network. It is to be appreciated that the network 304 can include one or more intermediate routers (not shown). As such, the system 300 can be implemented as a virtualized network system where different virtual networks can be hosted on the same physical network.

Each of the virtual private clusters 308a-n can include one or more virtual machines 316a-n. Each of the virtual machines 316a-n can communicate with other virtual machines via an IP address. For example, each of the virtual machines 316a-n in the virtual private cluster 308a can include a unique IP address. The virtual machines 316a-n can communicate (e.g., transmit and/or receive one or more data packets) via the unique IP address of each virtual machine 316a-n. Furthermore, each virtual machine 316a-n in each virtual private cluster 308b-n can include a unique IP address. One or more of the unique IP addresses in the virtual private cluster 308a can overlap with one or more unique IP addresses in the virtual private cluster 308b (and/or the virtual private clusters 308b-n). For example, a virtual machine in the virtual private cluster 308a and a virtual machine in the virtual private cluster 308b (and/or the virtual private clusters 308b-n) can include the same IP address. As such, one or more virtual private clusters 308a-n can include one or more virtual machines with overlapping IP addresses.

Furthermore, a particular virtual private cluster 308a-n can be implemented on multiple virtualized router networks 302a-n. As such, virtual machines associated with a particular virtual private cluster 308a-n (e.g., a particular virtual network) can be implemented on more than one virtualized router network 302a-n. In one example, the virtual private cluster 308a can include one or more virtual machines on the virtualized router network 302a and one or more virtual machines on the virtualized router network 302b. Therefore, a data packet associated with a particular virtual private cluster 308a-n can be forwarded from one virtualized router network to a different virtualized router network.

As such, the forwarding component 102 can receive a data packet 310 from one of the virtual private clusters 308a-n (e.g., a particular virtual machine within a virtual private cluster 308a-n). The data packet 310 can include a header (e.g., an inner header) 312. To transmit the data packet 310 over the network 304, the data packet 310 can be encapsulated. For example, the encapsulation component 110 can generate an outer header 314 for the data packet 310 via an encapsulation process. The encapsulation component 110 can encode a destination IP address (e.g., an IP address of a router in a particular virtualized router network 302b-n) in a destination IP field in the outer header 314 of the data packet 310. As such, the data packet 310 can be transmitted to a virtualized router network 302b-n with a router that corresponds to the encapsulated destination IP address in the destination IP field in the outer header 314. In one example, unique tunnels can be implemented to the same destination router to isolate traffic for different purposes (e.g., isolation of routing domains for further forwarding at the end of the tunnel).

Additionally, the encapsulation component 110 can encode routing domain information in the source IP field of the outer header 314 of the data packet 310. For example, instead of encoding the IP address of the router 306 in the virtualized router network 302a, a tag can be encoded in the source IP field of the outer header 314. The tag can associate the data packet 310 to a particular virtual private cluster 308a-n (e.g., the particular virtual private cluster 308a-n that transmitted the data packet 310). For example, the mapping component 104 can maintain a routing table for each of the virtual private clusters 308a-n. Each routing table can include each virtual machine in each virtualized router network 302a-n that corresponds to (e.g., is associated with) a particular virtual private cluster (e.g., virtual network) 308a-n. Each routing table can be associated with a unique tag. As such, the data packet 310 can be forwarded based on the particular routing table (e.g., a particular virtual private cluster 308a-n) associated with the tag. Additionally or alternatively, other information not used by intermediate routers in the network 304 can be encoded in the source IP field of the outer header 314. As such, intermediate routers within the network 304 can perform forwarding based on the destination IP field of the outer header 314. The router at the end of the tunnel (e.g., the destination router that corresponds to the encapsulated destination IP address in the destination IP field in the outer header 314) can decapsulate (e.g., de-encapsulate) the data packet 310. Based on the routing domain information stored in the source IP field of the outer header 314 (e.g., the tag stored in the source IP field of the outer header 314), the destination router can determine the corresponding virtual private cluster (e.g., the corresponding virtual private network) for the data packet 310. Therefore, a routing table associated with the tag can be used for further forwarding of the data packet 310 in the virtualized router networks 302b-n. As such, the number of consumed routing table entries for a router (e.g., a switch) can be reduced.

Figure 4:
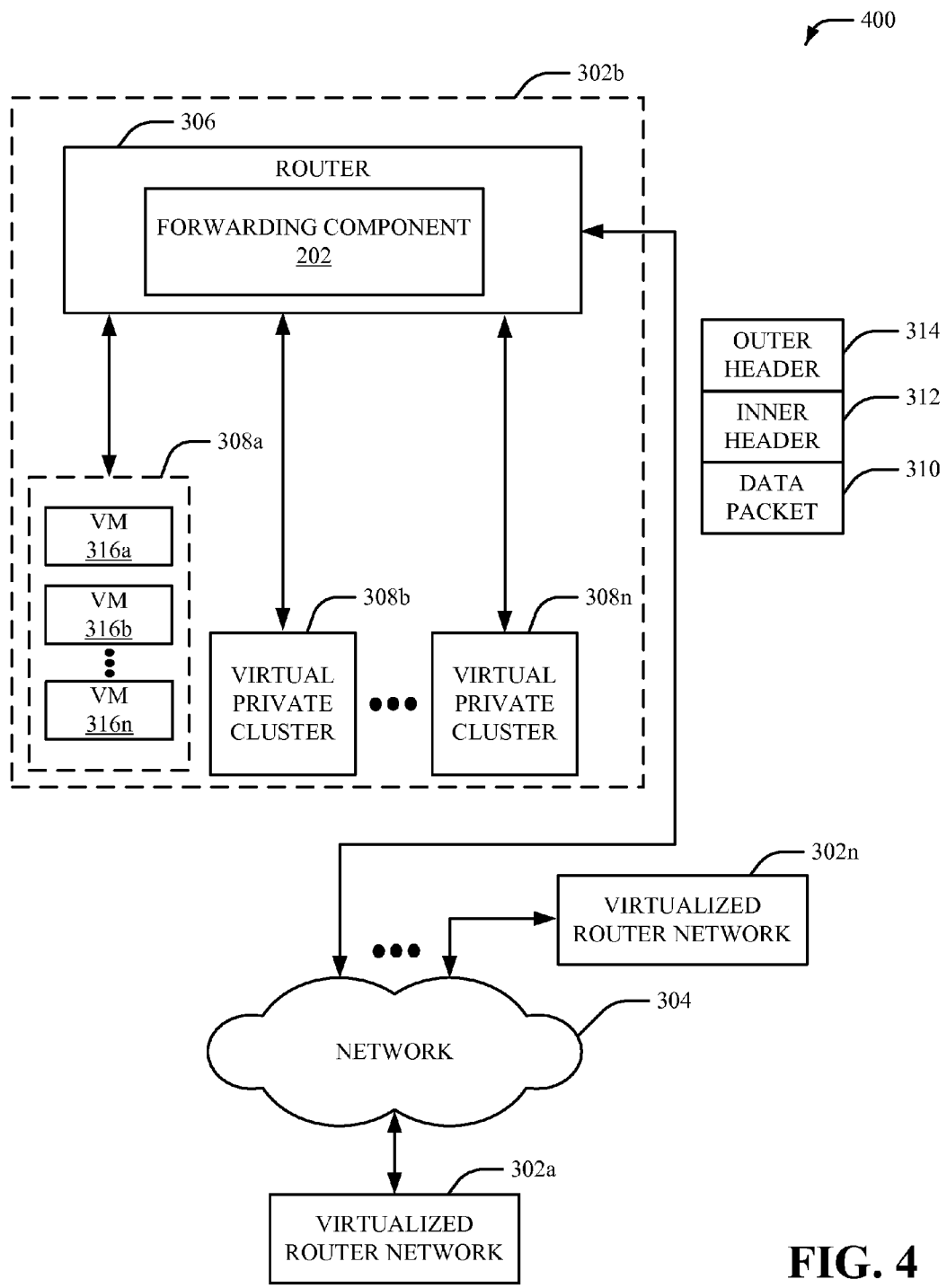
FIG. 4 illustrates a block diagram of an example virtualized network system implementing a forwarding component to forward an encapsulated data packet, in accordance with various aspects and implementations described herein.

Referring now to FIG. 4, there is illustrated a non-limiting implementation of a system 400 for decapsulating a data packet in accordance with various aspects and implementations of this disclosure. The system 400 includes the plurality of virtualized router networks 302a-n and the network (e.g., the virtualized network) 304. Each of the virtualized router networks 302a-n (e.g., the virtualized router network 302b shown in FIG. 4) includes a router 306 and one or more virtual private clusters (e.g., virtual networks) 308a-n. In the example shown in FIG. 4, the router 306 includes the forwarding component 202 (and/or the forwarding component 102). The forwarding component 202 can include the mapping component 204, the decapsulation component 206 and the routing component 208.

The forwarding component 202 can receive a data packet 310 (e.g., an encapsulated data packet) from the virtualized router network 302a or one of the virtualized router networks 302c-n. For example, the forwarding component can receive the data packet 310 transmitted by the virtualized router network 302a, as shown in FIG. 3. The data packet 310 can include the inner header 312 and the outer header 314. The outer header 314 can include the source IP field and the destination IP field. The destination IP field in the outer header 314 can include an IP address that corresponds to the router 306 in the virtualized router network 302b. The source IP field in the outer header 314 can include routing domain information. For example, the source IP field in the outer header 314 can include a tag that associates the data packet 310 to a particular virtual private cluster 308a-n in the virtualized router network 302b. As such, the data packet 310 can be classified to a particular virtual private cluster 308a-n in the virtualized router network 302b based on the data in the source IP field in the outer header 314. Further forwarding can be implemented using a routing table corresponding to the tag in the source IP field in the outer header 314. For example, further forwarding to a particular virtual machine 316a-n in a particular virtual private cluster 308a-n can be implemented based on the routing domain information stored in the source IP field in the outer header 314. As such, all intermediate routers in the network 304 can forward the data packet 310 to the virtualized router network 302b based on a single routing entry for a destination switch (e.g., the destination IP for the router 306 stored in the destination IP field in the outer header 314).

Figure 5:
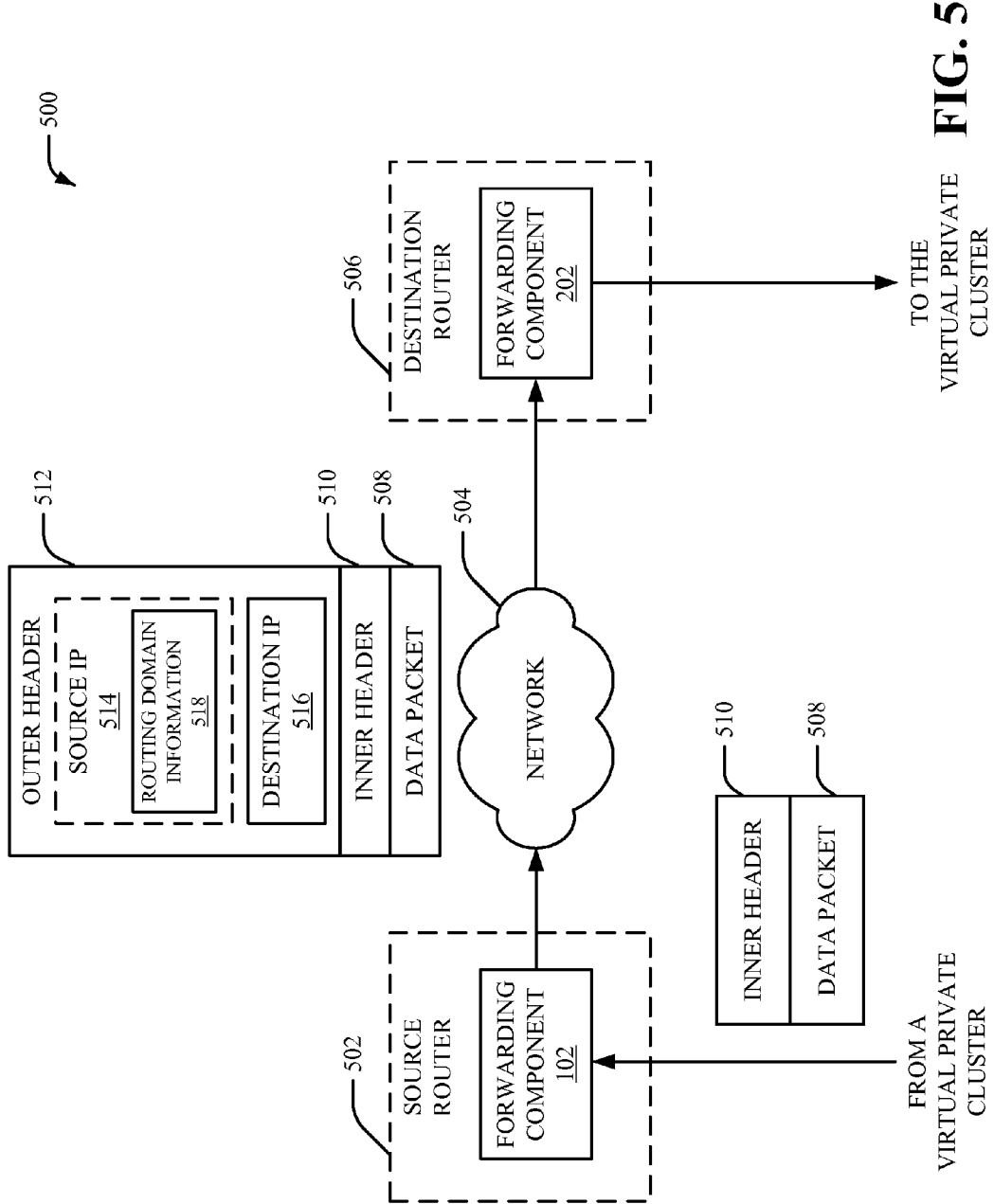
FIG. 5 illustrates an example transformation of a data packet using a forwarding component, in accordance with various aspects and implementations described herein.

Referring now to FIG. 5, there is illustrated a non-limiting implementation of a system 500 that implements tunneling in accordance with various aspects and implementations of this disclosure. The system 500 includes a source router 502, a network 504 and a destination router 506. The network 504 can include, for example, one or more intermediate routers (not shown). The source router 502 can include the forwarding component 102 (and/or the forwarding component 202). The destination router 506 can include the forwarding component 202 (and/or the forwarding component 102). The source router 502 can be implemented at the beginning (e.g., the starting point) of an IP tunnel. The destination router 506 can be implemented at the end (e.g., the end point) of the IP tunnel.

The forwarding component 102 can receive a data packet 508 from a virtual private cluster (e.g., a virtual private network). The data packet 508 can include an inner header 510. The forwarding component 102 (e.g., the encapsulation component 110) can encapsulate the data packet 508 with an outer header 512. The outer header 512 can include a source IP field 514 and a destination IP field 516. The source IP field 514 can be overwritten with routing domain information 518. The routing domain information 518 can include, for example, a tag that identifies which virtual private cluster (e.g., virtual private network) the data packet 502 was transmitted from. For example, the tag can classify the data packet 508 to the virtual private cluster (e.g., the virtual private network) that transmitted the data packet 508.

The forwarding component 202 (e.g., the decapsulation component 206) can decapsulate the data packet 502. For example, the forwarding component 202 (e.g., the decapsulation component 206) can acquire the routing domain information 518 from the source IP field 514 in the outer header 512. As such, the forwarding component 202 (e.g., the routing component 208) can forward the data packet 508 based on the routing domain information 518 stored in the source IP field 514.

Figure 6:
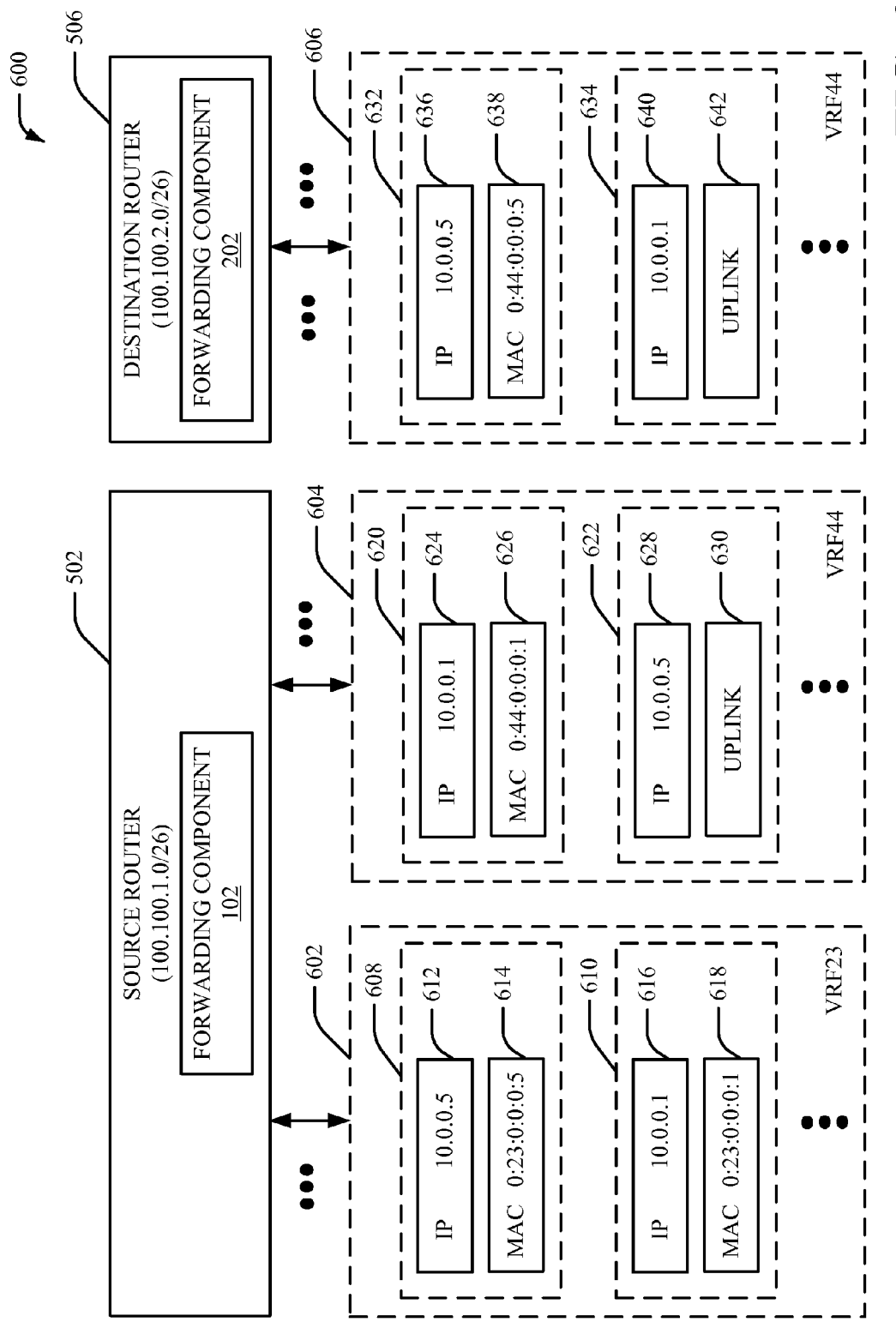
FIG. 6 illustrates a block diagram of a first forwarding component and a second forwarding component in an example virtualized network system, in accordance with various aspects and implementations described herein.

Referring now to FIG. 6, there is illustrated a non-limiting implementation of a system 600 in accordance with various aspects and implementations of this disclosure. The system 600 includes the source router 502 and the destination router 506. The source router 502 includes the forwarding component 102 (and/or the forwarding component 202). The forwarding component 102 can include the mapping component 104, the management component 106, the routing component 108 and the encapsulation component 110. In FIG. 6, the source router 502 includes a network address set to 100.100.1.0/26. The destination router 506 includes the forwarding component 202 (and/or the forwarding component 102). The forwarding component 202 can include the mapping component 204, the decapsulation component 206 and the routing component 208. In FIG. 6, the destination router 506 includes a network address set to 100.100.2.0/26. The source router 502 can be coupled to the destination router via a network (e.g., the network 504).

In the example system shown in FIG. 6, the source router 502 is coupled to a virtual private cluster 602 and a virtual private cluster 604. However, it is to be appreciated that the source router 502 can be coupled to additional virtual private clusters. The virtual private cluster 602 includes a virtual machine 608 and a virtual machine 610. However, it is to be appreciated that the virtual private cluster 602 can include additional virtual machines. The virtual machine 608 includes an IP address 612 set to 10.0.0.5 and a media access control (MAC) address 614 set to 0:23:0:0:0:5. The virtual machine 610 includes an IP address 616 set to 10.0.0.1 and a MAC address 618 set to 0:23:0:0:0:1. The virtual private cluster 604 includes a virtual machine 620 and a virtual machine 622. However, it is to be appreciated that the virtual private cluster 604 can include additional virtual machines. The virtual machine 620 includes an IP address 624 set to 10.0.0.1 and a MAC address 626 set to 0:44:0:0:0:1. The virtual machine 622 includes an IP address 628 set to 10.0.0.5 and an uplink (e.g., an uplink port) 630.

In the example system shown in FIG. 6, the destination router 506 is coupled to a virtual private cluster 606. However, it is to be appreciated that the destination router 506 can be coupled to additional virtual private clusters. The virtual private cluster 606 includes a virtual machine 632 and a virtual machine 634. However, it is to be appreciated that the virtual private cluster 606 can include additional virtual machines. The virtual private cluster 604 and the virtual private cluster 606 are implemented as the same virtual network (e.g., a virtual network VRF44). The virtual machine 632 includes an IP address 636 set to 10.0.0.5 and a MAC address 638 set to 0:44:0:0:0:5. The virtual machine 634 includes an IP address 640 set to 10.0.0.1 and an uplink (e.g., an uplink port) 642. For example, the uplink 642 can be implemented to receive data from the source router 502 and the uplink 630 can be implemented to receive data from the destination router 506.

As such, the virtual private cluster 602, the virtual private cluster 604 and the virtual private cluster 606 can each include a virtual machine with an IP address set to 10.0.0.1 and a virtual machine with an IP address set to 10.0.0.5. For example, the IP address 612 and the IP address 636 both include an IP address set to 10.0.0.5. The IP address 616 and the IP address 624 both include an IP address set to 10.0.0.1. Therefore, the virtual private cluster 602, the virtual private cluster 604 and the virtual private cluster 606 include overlapping IP addresses.

In one example, a data packet (e.g., the data packet 508) from the virtual machine 620 in the virtual private cluster 604 (e.g., the virtual network VRF44) can be transmitted to the source router 502 (e.g., the forwarding component 102). Based on a tag stored in the data packet (e.g., a tag stored in the outer header 512), the data packet can be classified to the virtual network VRF44. As such, the data packet can be forwarded based on a routing table associated with the virtual network VRF44. Additionally, the forwarding component 102 (e.g., the encapsulation component 110) can encapsulate the destination IP in an outer header of the data packet (e.g., destination IP 516) with the IP address 100.100.2.21. As such, the data packet can be transmitted to the destination router 506, since the IP address 100.100.2.21 is in the subnet of the destination router 506. Furthermore, the forwarding component 102 (e.g., the encapsulation component 110) can encapsulate the source IP field in the outer header of the data packet (e.g., source IP 514) with routing domain information (e.g., routing domain information 518) corresponding to the virtual network VRF44. For example, the source IP field in the outer header of the data packet can be set to 50.50.50.44, which corresponds to the virtual network VRF44. Thus, the tag can include an IP address (e.g., an alternate IP address) that is not used by a virtual machine and/or a router in the system 600 (e.g., the tag can be a modified IP address which identifies the virtual network).

As such, the source IP field in the outer header of the data packet can be ignored by routers (e.g., intermediate routers) in the network 504 between the source router 502 and the destination router 506. When the data packet reaches the destination router 506, the forwarding component 202 (e.g., the decapsulation component 206) can decapsulate the data packet. As such, the data packet can be associated with the virtual network VRF44 (e.g., the virtual private cluster 606) based on the routing domain information stored in the source IP in the outer header of the data packet (e.g., the 50.50.50.44 tag stored in the source IP in the outer header of the data packet). Subsequent forwarding of the data packet (e.g., to virtual machines in the virtual private cluster 606) can be implemented using a routing table associated with the network VRF44.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

FIGS. 7-10 illustrate methodologies and/or flow diagrams in accordance with the disclosed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device or storage media.

Figure 7:
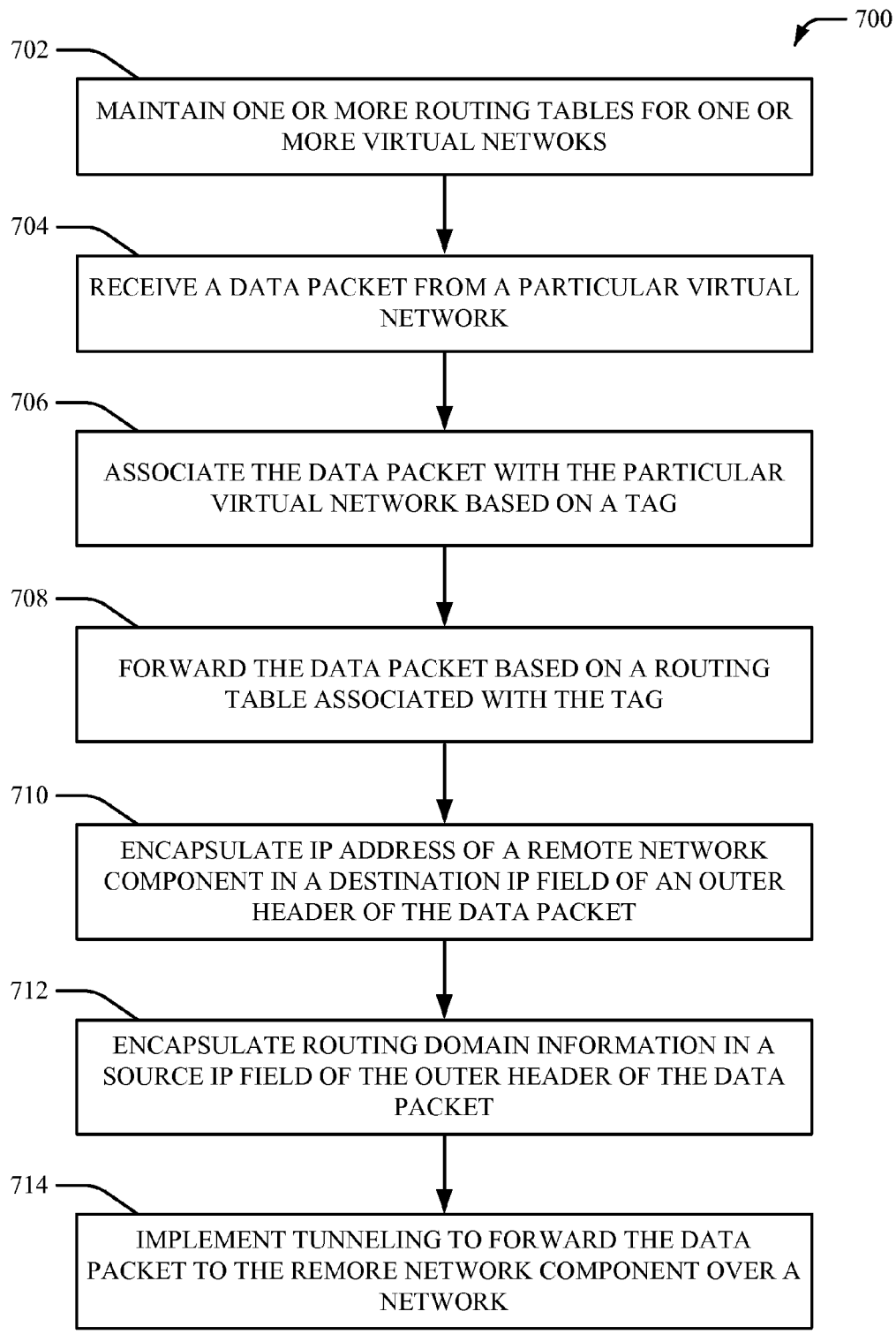
FIG. 7 depicts a flow diagram of an example method for forwarding a data packet between network components in a virtualized network system using a tunneling protocol, in accordance with various aspects and implementations described herein.

Referring to FIG. 7, there illustrated is a methodology 700 for forwarding a data packet between network components in a virtualized network system, according to an aspect of the subject innovation. As an example, methodology 700 can be utilized in various applications, such as, but not limited to, data center systems (e.g., virtualized data center systems), network systems (e.g., virtualized network systems), computer network systems (e.g., virtualized computer network systems), communication systems, router systems, server systems, high availability server systems (e.g., Telecom server systems), Web server systems, file server systems, media server systems, disk array systems, powered insertion board systems, etc. Specifically, the methodology 700 forwards a data packet in a virtualized network system by overriding a source IP field in an outer header of a data packet while implementing a tunneling protocol.

At 702, one or more routing tables for one or more virtual networks can be maintained (e.g., by a mapping component 104). For example, the mapping component 104 can maintain one or more routing tables that associates one or more virtual machines in a physical network to a particular virtual network. At 704, a data packet can be received (e.g., by a management component 106) from a particular virtual network. For example, a data packet can be received by a virtual machine in a particular virtual network. At 706, the data packet can be associated (e.g., using a management component 106) with the particular virtual network based on a tag. For example, a tag can be stored in the data packet. As such, the virtual network associated with the data packet can be determined based on the tag. At 708, the data packet can be forwarded (e.g., using a routing component 108) based on a routing table associated with the tag. For example, the data packet can be forwarded based on a routing table associated with the particular virtual network (e.g., associated with the tag). At 710, an IP address of a remote network component can be encapsulated (e.g., using an encapsulation component 110) in a destination IP field of an outer header of the data packet. For example, the destination IP field of an outer header of the data packet can store an IP address corresponding to the remote network component (e.g., a remote router). At 712, routing domain information can be encapsulated (e.g., using an encapsulation component 110) in a source IP field of the outer header of the data packet. For example, the source IP field of the outer header of the data packet can store routing domain information for the data packet (e.g., a tag). At 714, tunneling can be implemented (e.g., using an encapsulation component 110) to forward the data packet to the remote network component over a network. For example, the data packet can be forwarded over a network using a tunneling protocol. The data packet can be forwarded to a remote network component that is coupled to one or more virtual machines associated with the particular virtual network.

Figure 8:
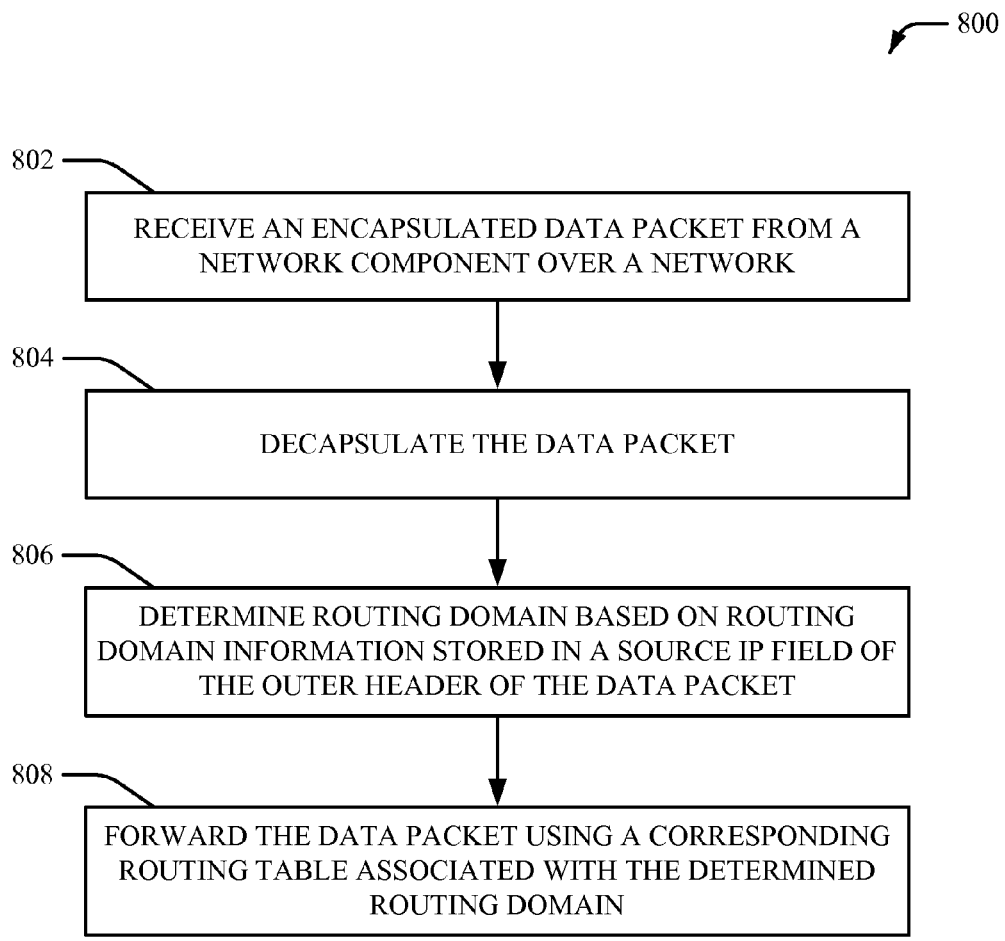
FIG. 8 depicts a flow diagram of an example method for receiving and forwarding an encapsulated data packet in a virtualized network system, in accordance with various aspects and implementations described herein.

Referring to FIG. 8, there illustrated is an example methodology 800 for forwarding an encapsulated data packet in a virtualized network system, according to an aspect of the subject innovation. At 802, an encapsulated data packet can be received (e.g., by a decapsulation component 206) from a network component over a network. For example, the encapsulated data packet can include an inner header and an outer header. The encapsulated data packet can be received, e.g., from the forwarding component 102 (e.g., the forwarding component 102 can encapsulate the encapsulated data packet). At 804, the data packet can be decapsulated (e.g., by a decapsulation component 206). For example, data content (e.g., information stored) in the outer header (e.g., the IP source field and/or the IP destination field of the outer header) of the data packet can be read. At 806, a routing domain can be determined (e.g., using a routing component 208) based on routing domain information stored in a source IP field of an outer header of the data packet. For example, a corresponding virtual network for the data packet (e.g., a virtual network associated with the data packet) can be determined based on routing domain information (e.g., a tag) stored in a source IP field of the outer header of the data packet. At 808, the data packet can be forwarded (e.g., by a routing component 208) using a corresponding routing table associated with the determined routing domain. For example, a routing table associated with the determined routing domain (e.g., the tag) can be used to forward the data packet to a virtual machine in a virtual network associated with the routing domain.

Figure 9:
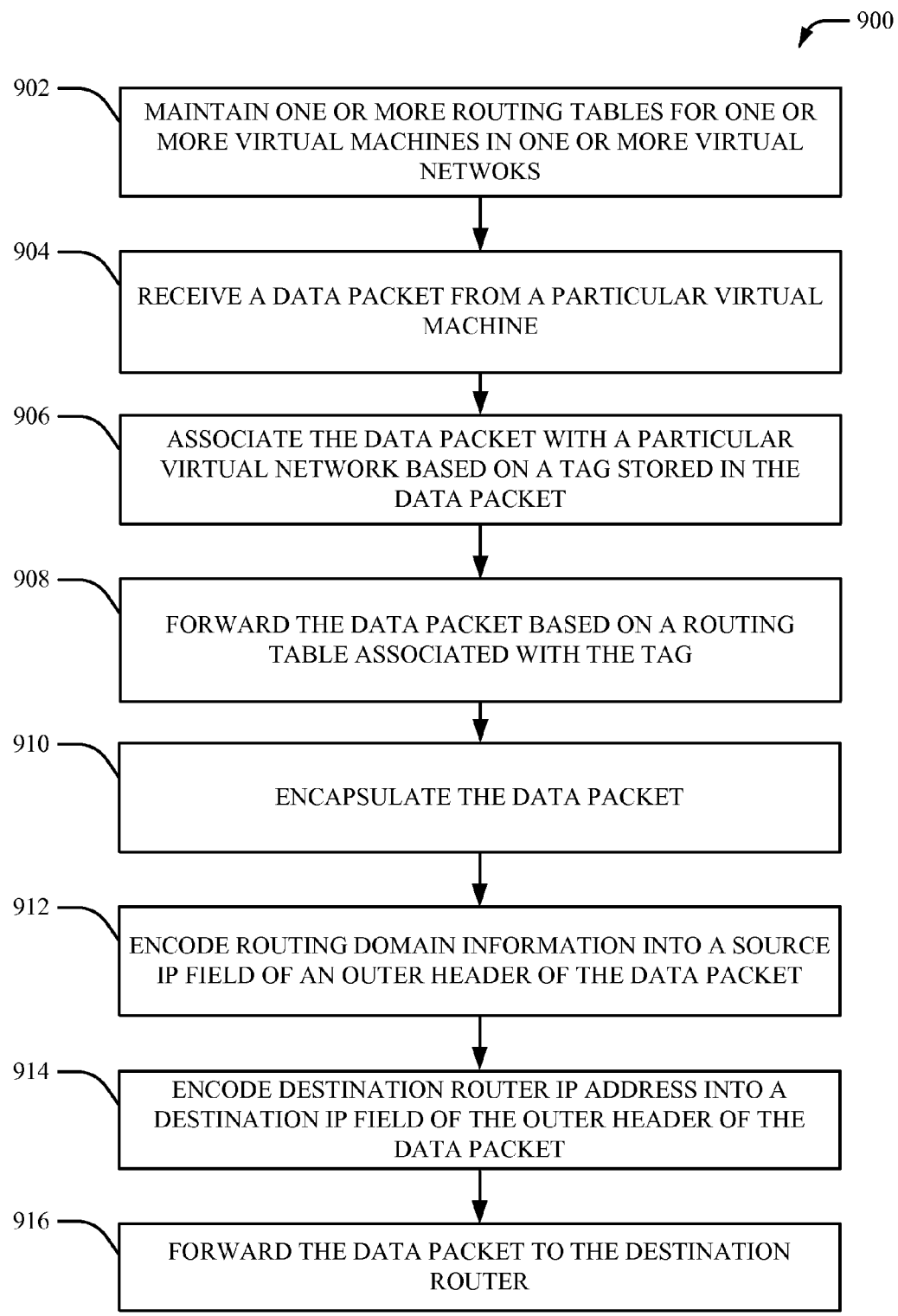
FIG. 9 depicts a flow diagram of an example method for encapsulating a data packet for a tunneling protocol, in accordance with various aspects and implementations described herein.

Referring to FIG. 9, there illustrated is an example methodology 900 for forwarding and encapsulating a data packet, according to an aspect of the subject innovation. At 902, one or more routing tables for one or more virtual machines in one or more virtual networks can be maintained (e.g., by a mapping component 104). For example, each virtual network can be associated with a unique routing table. At 904, a data packet can be received (e.g., by a management component 106) from a particular virtual machine. For example, a data packet can be received from a virtual machine in a particular virtual network. A 906, the data packet can be associated (e.g., by a routing component 108) with a particular virtual network based on a tag stored in the data packet. For example, a tag can be stored in an outer header of the data packet. The tag can correspond to the particular virtual network that includes the particular virtual machine. At 908, the data packet can be forwarded (e.g., by a routing component 108) based on a routing table associated with the tag. For example, each of the one or more routing tables can be associated with a unique tag (e.g., a particular virtual network). At 910, the data packet can be encapsulated (e.g., by an encapsulation component 110). For example, the data packet can be encapsulated with an outer header. At 912, routing domain information can be encoded (e.g., by an encapsulation component 110) into a source IP field of an outer header of the data packet. For example, a tag can be stored (e.g., can override data that is stored) in the source IP field of the outer header. As 914, a destination router IP address can be encoded (e.g., by an encapsulation component 110) into a destination IP field of the outer header of the data packet. As such, intermediate routers can forward the data packet based on the destination IP field of the outer header. At 916, the data packet can be forwarded to the destination router. For example, the data packet can be forwarded using a tunneling protocol (e.g., an IP tunnel). As such, the destination IP router can be set as the end point of the IP tunnel.

Figure 10:
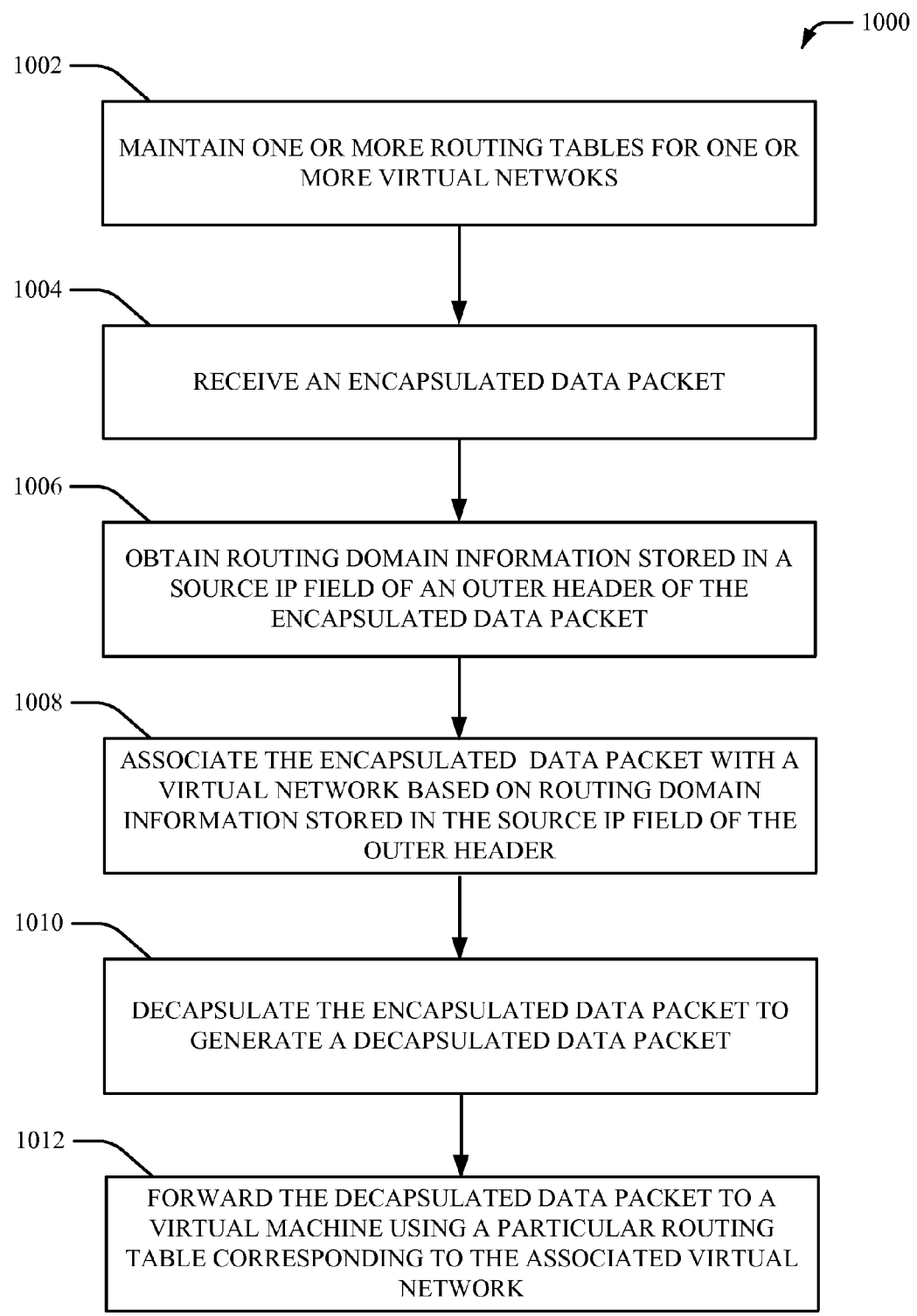
FIG. 10 depicts a flow diagram of an example method for decapsulating and forwarding an encapsulated data packet, in accordance with various aspects and implementations described herein.

Referring to FIG. 10, there illustrated is a methodology 1000 for decapsulating and forwarding a data packet, according to an aspect of the subject innovation. At 1002, one or more routing tables can be maintained (e.g., by a mapping component 204) for one or more virtual networks. For example, a unique routing table can be maintained for each virtual network in a virtualized network system. At 1004, an encapsulated data packet can be received (e.g., by a decapsulation component 206). For example, an encapsulated data packet transmitted via an IP tunnel can be received. At 1006, routing domain information stored in a source IP field of an outer header of the encapsulated data packet can be obtained (e.g., by a decapsulation component 206). For example, the encapsulated data packet can be decapsulated. As such, routing domain information (e.g., a tag) in the source IP field of the outer header of the data packet can be obtained. At 1008, the routing domain information can be associated (e.g., by a routing component 208) with a virtual network based on the routing domain information stored in the source IP field of the outer header. For example, a tag stored in the source IP field of the outer header can be associated with a virtual network. At 1010, the data packet can be decapsulated (e.g., by a decapsulation component 206) to generate a decapsulated data packet. For example, the outer header of the encapsulated data packet can be removed. At 1012, the decapsulated data packet can be forwarded (e.g., by routing component 208) to a virtual machine using a particular routing table corresponding to the associated virtual network. For example, the data packet can be forwarded to a virtual machine coupled to the destination IP router based on a routing table associated with the tag stored in the source IP field of the outer header.

Figure 11:
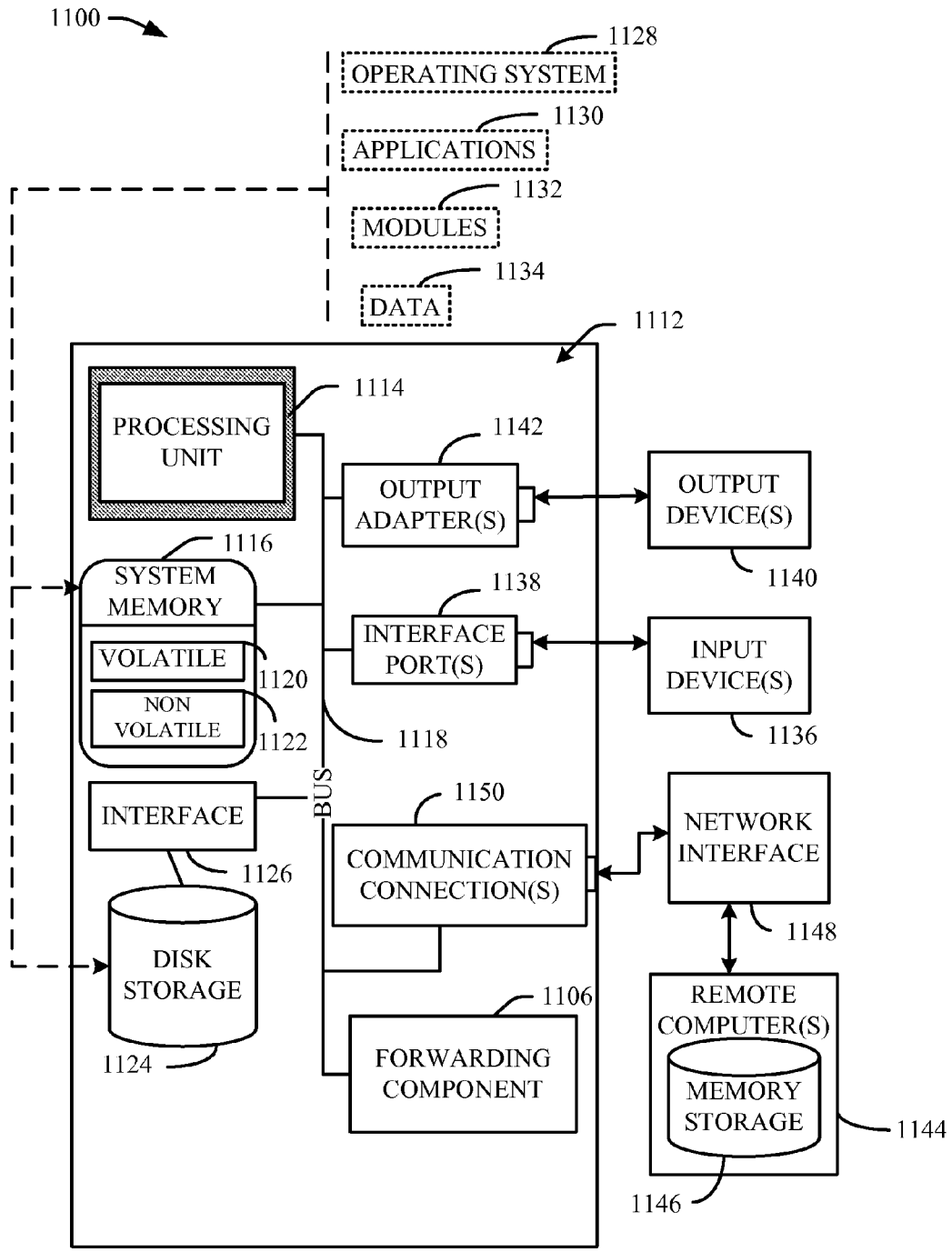
FIG. 11 is a schematic block diagram illustrating a suitable operating environment.
Figure 12:
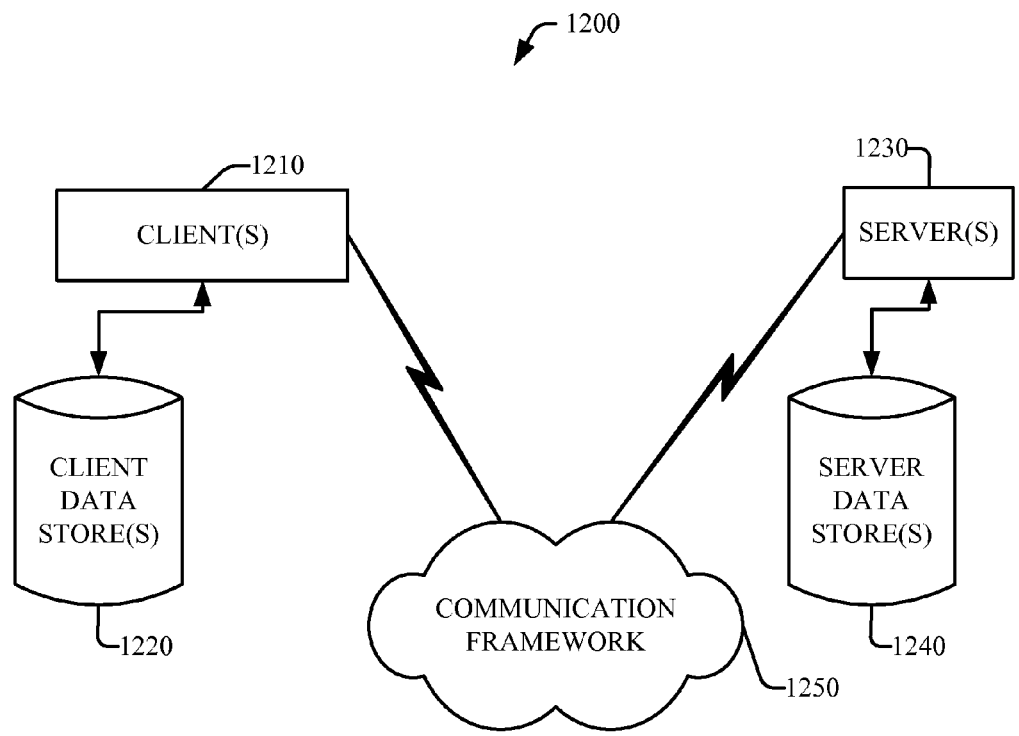
FIG. 12 is a schematic block diagram of a sample-computing environment.

In order to provide a context for the various aspects of the disclosed subject matter, FIGS. 11 and 12 as well as the following discussion are intended to provide a brief, general description of a suitable environment in which the various aspects of the disclosed subject matter may be implemented.

With reference to FIG. 11, a suitable environment 1100 for implementing various aspects of this disclosure includes a computer 1112. The computer 1112 includes a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multiprocessor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1120 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1112 also includes removable/non-removable, volatile/non-volatile computer storage media. FIG. 11 illustrates, for example, a disk storage 1124. Disk storage 1124 includes, but is not limited to, devices like a magnetic disk drive, floppy disk drive, tape drive, Jaz drive, Zip drive, LS-100 drive, flash memory card, or memory stick. The disk storage 1124 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used, such as interface 1126.

FIG. 11 also depicts software that acts as an intermediary between users and the basic computer resources described in the suitable operating environment 1100. Such software includes, for example, an operating system 1128. Operating system 1128, which can be stored on disk storage 1124, acts to control and allocate resources of the computer system 1112. System applications 1130 take advantage of the management of resources by operating system 1128 through program modules 1132 and program data 1134, e.g., stored either in system memory 1116 or on disk storage 1124. It is to be appreciated that this disclosure can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112, and to output information from computer 1112 to an output device 1140. Output adapter 1142 is provided to illustrate that there are some output devices 1140 like monitors, speakers, and printers, among other output devices 1140, which require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems and DSL modems, ISDN adapters, and Ethernet cards.

It is to be appreciated that the computer 1112 can be used in connection with implementing one or more of the systems or components shown and described in connection with FIGS. 1-6. In accordance with various aspects and implementations, the computer 1112 can be used to separate routing domains in a virtual network system. In certain exemplary embodiments, the computer 1112 includes a forwarding component 1106 (e.g., the forwarding component 102 and/or the forwarding component 202) that can contain, for example, a mapping component 104, a management component 106, a routing component 108, an encapsulation component 110, a mapping component 204, a decapsulation component 206 and/or a routing component 208, each of which can respectively function as more fully disclosed herein.

FIG. 12 is a schematic block diagram of a sample-computing environment 1200 with which the subject matter of this disclosure can interact. The system 1200 includes one or more client(s) 1210. The client(s) 1210 can be hardware and/or software (e.g., threads, processes, computing devices). The system 1200 also includes one or more server(s) 1230. Thus, system 1200 can correspond to a two-tier client server model or a multi-tier model (e.g., client, middle tier server, data server), amongst other models. The server(s) 1230 can also be hardware and/or software (e.g., threads, processes, computing devices). The servers 1230 can house threads to perform transformations by employing this disclosure, for example. One possible communication between a client 1210 and a server 1230 may be in the form of a data packet transmitted between two or more computer processes.

The system 1200 includes a communication framework 1250 that can be employed to facilitate communications between the client(s) 1210 and the server(s) 1230. The client(s) 1210 are operatively connected to one or more client data store(s) 1220 that can be employed to store information local to the client(s) 1210. Similarly, the server(s) 1230 are operatively connected to one or more server data store(s) 1240 that can be employed to store information local to the servers 1230.

It is to be noted that aspects or features of this disclosure can be exploited in substantially any wireless telecommunication or radio technology, e.g., Wi-Fi; Bluetooth; Worldwide Interoperability for Microwave Access (WiMAX); Enhanced General Packet Radio Service (Enhanced GPRS); Third Generation Partnership Project (3GPP) Long Term Evolution (LTE); Third Generation Partnership Project 2 (3GPP2) Ultra Mobile Broadband (UMB); 3GPP Universal Mobile Telecommunication System (UMTS); High Speed Packet Access (HSPA); High Speed Downlink Packet Access (HSDPA); High Speed Uplink Packet Access (HSUPA); GSM (Global System for Mobile Communications) EDGE (Enhanced Data Rates for GSM Evolution) Radio Access Network (GERAN); UMTS Terrestrial Radio Access Network (UTRAN); LTE Advanced (LTE-A); etc. Additionally, some or all of the aspects described herein can be exploited in legacy telecommunication technologies, e.g., GSM. In addition, mobile as well non-mobile networks (e.g., the Internet, data service network such as internet protocol television (IPTV), etc.) can exploit aspects or features described herein.

While the subject matter has been described above in the general context of computer-executable instructions of a computer program that runs on a computer and/or computers, those skilled in the art will recognize that this disclosure also can or may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multi-processor computer systems, mini-computing devices, mainframe computers, as well as personal computers, hand-held computing devices (e.g., PDA, phone), microprocessor-based or programmable consumer or industrial electronics, and the like. The illustrated aspects may also be practiced in distributed computing environments where tasks are performed by remote processing devices that are linked through a communications network. However, some, if not all aspects of this disclosure can be practiced on stand-alone computers. In a distributed computing environment, program modules may be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

Various aspects or features described herein can be implemented as a method, apparatus, system, or article of manufacture using standard programming or engineering techniques. In addition, various aspects or features disclosed in this disclosure can be realized through program modules that implement at least one or more of the methods disclosed herein, the program modules being stored in a memory and executed by at least a processor. Other combinations of hardware and software or hardware and firmware can enable or implement aspects described herein, including a disclosed method(s). The term "article of manufacture" as used herein can encompass a computer program accessible from any computer-readable device, carrier, or storage media. For example, computer readable storage media can include but are not limited to magnetic storage devices (e.g., hard disk, floppy disk, magnetic strips . . . ), optical discs (e.g., compact disc (CD), digital versatile disc (DVD), blu-ray disc (BD) . . . ), smart cards, and flash memory devices (e.g., card, stick, key drive . . . ), or the like.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or methods herein are intended to include, without being limited to including, these and any other suitable types of memory.

It is to be appreciated and understood that components (e.g., forwarding component, mapping component, management component, routing component, encapsulation component, decapsulation component, etc.), as described with regard to a particular system or method, can include the same or similar functionality as respective components (e.g., respectively named components or similarly named components) as described with regard to other systems or methods disclosed herein.

What has been described above includes examples of systems and methods that provide advantages of this disclosure. It is, of course, not possible to describe every conceivable combination of components or methods for purposes of describing this disclosure, but one of ordinary skill in the art may recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
 a memory storing computer executable components; and
 a processor configured to execute the following computer executable components stored in the memory:

a mapping component that maps a plurality of first virtual machines with a plurality of unique addresses in a first virtual network to a first routing table and a plurality of second virtual machines with the plurality of unique addresses in a second virtual network to a second routing table;

a management component that associates a data packet with the first virtual network or the second virtual network based on a tag stored in the data packet;

a routing component that forwards the data packet based on the first routing table in response to a determination that the data packet is associated with the first virtual network and forwards the data packet based on the second routing table in response to a determination that the data packet is associated with the second virtual network; and an encapsulation component that encodes a virtual cluster identifier into an outer source internet protocol (IP) field of the data packet.

2. The system of claim 1, wherein the virtual cluster identifier is associated with a particular virtual network.

3. The system of claim 1, wherein the system is implemented in a router at a starting point of an IP tunnel.

4. The system of claim 3, wherein the virtual cluster identifier is an IP address that is different than an IP address of the router.

5. The system of claim 3, wherein the outer source IP field stores information not used by an intermediate router in the IP tunnel.

6. The system of claim 1, wherein the data packet is forwarded to a router implemented remotely from the system.

7. The system of claim 1, wherein one or more of the plurality of first virtual machines is coupled to a first router and one or more of the plurality of first virtual machines is coupled to a second router.

8. The system of claim 1, wherein one or more of the plurality of second virtual machines is coupled to a first router and one or more of the plurality of second virtual machines is coupled to a second router.

9. The system of claim 1, wherein the encapsulation component implements a tunneling protocol.

10. The system of claim 1, wherein the system includes one or more virtual machines that include one or more IP addresses that are different than the plurality of unique addresses.

11. The system of claim 1, wherein the virtual cluster identifier includes the tag.

12. The system of claim 1, wherein the tag is the virtual cluster identifier.

13. A system, comprising:
a memory storing computer executable components; and
a processor configured to execute the following computer executable components stored in the memory:
a mapping component that maps a plurality of first virtual machines with a plurality of unique addresses in a first virtual network to a first routing table and a plurality of second virtual machines with the plurality of unique addresses in a second virtual network to a second routing table;
a decapsulation component that associates a data packet with the first virtual network or the second virtual network based on a tag coded in an outer source internet protocol (IP) field of the data packet, wherein the outer source IP field of the data packet is encoded with a destination virtual cluster identifier; and
a routing component that forwards the data packet using the first routing table in response to a determination that the data packet is associated with the first virtual network and forwards the data packet using the second routing table in response to a determination that the data packet is associated with the second virtual network.

14. The system of claim 13, wherein the tag includes routing domain information.

15. The system of claim 13, wherein the data packet is an encapsulated data packet.

16. The system of claim 13, wherein the system is implemented in a router at an end point of an IP tunnel.

17. A method, comprising:
employing a processor that facilitates execution of computer executable instructions stored on a non-transitory computer readable medium to implement operations comprising:
maintaining one or more routing tables for one or more virtual networks;
receiving a data packet from a particular virtual network;
associating the data packet with the particular virtual network based on a tag encoded in the data packet;
forwarding the data packet, based on a routing table associated with the tag, wherein the forwarded data packet is encoded with a destination virtual cluster identifier; and
encoding the destination virtual cluster identifier into an outer source internet protocol (IP) field of the data packet.

18. The method of claim 17, wherein the encoding includes encapsulating the data packet with an outer header.

19. The method of claim 17, wherein the encoding includes encoding the tag into the outer source IP field of the data packet.

20. The method of claim 19, wherein the tag is the virtual cluster identifier.

21. The method of claim 17, further comprising encoding an IP address of a remote router into an outer destination IP field of the data packet and implementing tunneling to forward the data packet to a remote network component over a network.

22. The method of claim 17, wherein the virtual cluster identifier is associated with the particular virtual network.

23. A method, comprising:
employing a processor that facilitates execution of computer executable instructions stored on a non-transitory computer readable medium to implement operations comprising:
maintaining one or more routing tables for one or more virtual networks;
receiving an encapsulated data packet via a tunneling protocol;
obtaining a virtual cluster identifier from an outer source IP field of the encapsulated data packet;
associating the encapsulated data packet with a particular virtual network based on the virtual cluster identifier;
decapsulating the encapsulated data packet to generate a decapsulated data packet; and
forwarding the decapsulated data packet to a virtual machine using a particular routing table corresponding to the particular virtual network.

24. The method of claim 23, wherein the virtual cluster identifier includes a tag associated with the particular virtual network.

25. The method of claim 23, wherein the processor receiving the encapsulated data packet is implemented in a router at an end point of an IP tunnel.

* * * * *